United States Patent
Barboza et al.

(10) Patent No.: US 12,206,733 B2
(45) Date of Patent: *Jan. 21, 2025

(54) MEDIA TRANSFER FOR REMOTE DEVICE INFRASTRUCTURE

(71) Applicant: BrowserStack Limited, Dublin (IE)

(72) Inventors: James Barboza, Mumbai (IN); Kunal Chowdhary, Mumbai (IN)

(73) Assignee: BrowserStach Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,303

(22) Filed: May 20, 2024

(65) Prior Publication Data

US 2024/0314199 A1 Sep. 19, 2024

Related U.S. Application Data

(63) Continuation of application No. 18/136,776, filed on Apr. 19, 2023, now Pat. No. 11,991,243, which is a continuation of application No. 17/855,484, filed on Jun. 30, 2022, now Pat. No. 11,637,895.

(51) Int. Cl.
*H04L 67/104* (2022.01)
(52) U.S. Cl.
CPC ................................. *H04L 67/104* (2013.01)

(58) Field of Classification Search
None
See application file for complete search history.

(56) References Cited

U.S. PATENT DOCUMENTS

| | | | |
|---|---|---|---|
| 11,836,207 B2 * | 12/2023 | Es-skouri | G06F 16/958 |
| 11,886,325 B2 * | 1/2024 | Barboza | G06F 8/53 |
| 2016/0330266 A1 * | 11/2016 | Bakhmutov | H04L 67/104 |

* cited by examiner

*Primary Examiner* — Jeffrey R Swearingen
(74) *Attorney, Agent, or Firm* — Cognition IP, P.C.; Edward Steakley; Saleh Kaihani

(57) ABSTRACT

A software development infrastructure can enable user developers to select a remote device, among a plurality of remote devices in a datacenter, to develop and test their software programs. User developers can access remote devices from their local computers, via a communication network. For some tests and development activity, a user developer may wish to test media playback on a remote device in a datacenter. The default configuration of the network media transmission objects of the communication network can be modified to use operating system media capture APIs. The user developer can perform media playback on a remote device in a datacenter, from the local computer of the user developer.

20 Claims, 5 Drawing Sheets

MEDIA TRANSFER FOR REMOTE DEVICE INFRASTRUCTURE

CROSS-REFERENCE TO RELATED APPLICATIONS

This application is a continuation of U.S. application Ser. No. 18/136,776, filed on Apr. 19, 2023, which is a continuation of U.S. application Ser. No. 17/855,484, filed on Jun. 30, 2022, which are hereby incorporated by reference in their entirety.

BACKGROUND

Field

This invention relates generally to the field of enabling a remote device infrastructure for software development on a remote device, and more particularly to systems and methods for transferring media in such environment.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given businesses and consumers a vast array of options when they choose a device. The plethora of choices include both hardware and software. Naturally, software, application and website developers have a keen interest in ensuring their products work seamlessly across the existing hardware and platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer may not want to risk losing a potential market segment by disregarding a particular platform in his typical development cycle. Even for prominent platforms, such as iOS® and Android®, at any given time, there are multiple generations and iterations of these devices on the market, further complicating the development and testing process across multiple platforms. Even in a given platform, a variety of software, operating systems and browser applications are used by a potential target audience of a developer. This dynamic illustrates a need for a robust infrastructure that enables developers to test their products across multiple devices and platforms, without having to purchase or configure multiple devices and platforms.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
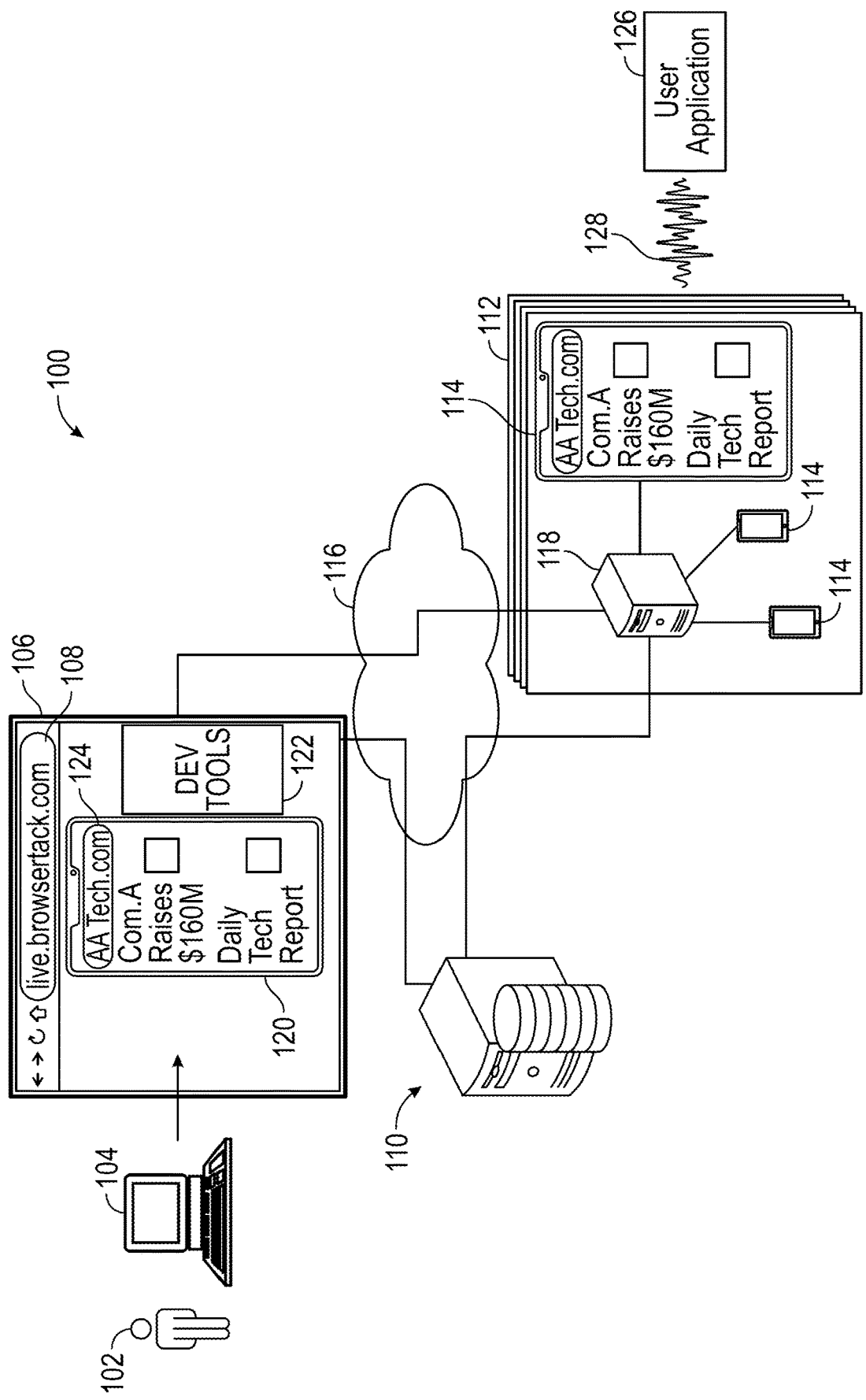
FIG. 1 illustrates an example remote development system (RDS).

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and Windows® Mobile, Windows® Phone and others. Furthermore, end-users have a variety of choices as far as the web browser application they can use. Examples include Safari®, Chrome®, FireFox®, Windows Explorer®, and others. This variety of choice presents a difficult challenge for a web/app developer to test and develop products on potential target devices. Traditionally, the developer might have to acquire a test device and spend resources configuring it (for example, by installing a target OS, browser, etc.) as well as a secondary hardware device to connect the test device through the secondary hardware device to a local machine of the developer, in order to write code and conduct tests on the test device. The sheer variety of possible devices, operating systems, browsers and combinations of them are numerous and can present a logistical hurdle to the developer.

A testing provider can enable a remote development system (RDS), having a multitude of remote devices for a developer to connect to and conduct tests and development activity. The developer can connect to the RDS, select a remote device, select a configuration (e.g., a particular browser, etc.) and run tests and development activity using the selected remote device. The RDS can include a server powering a website or a desktop application on the client or developer-side, which the developer can use to launch a dashboard for connecting to the RDS and for conducting tests and development activity. The dashboard can include a mirrored display of the remote device presented to the developer. The RDS can capture developer inputs and transmit them to the remote device. The RDS mirrors the display of the remote device on the developer's local machine and simultaneously captures the developer's interactions inputted onto the mirrored display and transfers those commands to the remote device. In a typical case, the developer can use a keyboard and mouse to input interactions onto the mirrored display. When the remote device is a smart phone device, the RDS translates those input interactions compatible with the smart phone. Examples of smart phone input interactions include gestures, pinches, swipes, taps, and others. The remote device display is mirrored on the developer's local machine. In this manner, the developer can experience a seamless interaction with the remote device using the developer's local machine, as if the remote device were physically present at the location of the developer. The RDS can be used both for development of launched and unlaunched products.

FIG. 1 illustrates an example RDS 100. Although some embodiments use the RDS 100 in the context of testing and software development, the RDS 100 can be used to enable a remote session for any purpose. Testing is merely provided as an example context of usage area of the system and infrastructure of the RDS 100. A user 102 uses a local machine 104 to launch a browser 106 to access a dashboard application to interact with the RDS 100, connect to a remote device and to conduct tests on the remote device. The user 102 may be a software developer. In some embodiments, the dashboard website/web application may be replaced by a desktop application, which the user 102 can install on the local machine 104. The user 102 may be a software developer, such as a website developer, web application developer or a mobile application developer. The local machine 104, in a typical case, may be a laptop or desktop computer, which the user 102 can use to write software code, debug, or run tests on a website/web application or mobile application. The user 102 can enter a uniform resource locator (URL) 108 in the browser 106 to connect to the dashboard application powered by a server 110. The server 110 can enable the browser 106 and a remote device 114 to establish a connection. The server 110 may include a plurality of internal servers or a distributed network of servers 110. The RDS 100 can use the connection for streaming the display of a remote device 114 onto the browser 106 in order to mirror the display of the remote device 114 and present it to the user 102. The RDS 100 can also capture user inputs entered into the mirrored display and input them to the remote device 114.

The RDS 100 can include multiple datacenters 112 in various geographical locations. The datacenters 112 can include a variety of test devices for the users 102 to connect with and to conduct tests. In this description, the test devices in datacenters 112 are referred to as remote devices 114, as they are remote, relative to the user 102 and the user's local machine 104. A variety of communication networks 116 can be used to enable connection between the browser 106, the server 110 and the remote device 114. The remote devices 114 can include various hardware platforms, provided by various manufacturers, different versions of each brand (for example, old, midmarket, new) and optionally various copies of each brand, to enable availability for numerous users 102 to connect and conduct tests.

The RDS 100 can use a host 118 connected to one or more remote devices 114. In some embodiments, the browser 106 does not directly communicate with the remote device 114. The host 118 enables communication between the browser 106 and the remote device 114 through one or more private and/or public communication networks and other components of the RDS 100, such as the server 110 or other additional components. The host 118 can be a desktop, laptop, or other hardware connected with a wired or wireless connection to the remote device 114. The hardware used for the host 118 can depend on the type of the remote device 114 that it hosts. Examples of host 118 hardware can include Apple Mac Mini® computers for iPhone® and iOS® devices and Zotac® for Android® devices.

The RDS 100 mirrors the display of the remote device 114 on the browser 106, by generating a display 120 on the browser 106. In some embodiments, the display 120 can be a graphical, or pictorial replica representation of the remote device 114. For example, if an iPhone® 12 device is chosen, the display 120 can be an image of an iPhone® 12. The RDS 100 mirrors the display of the remote device 114 on the display 120 by streaming a video feed of the display of the remote device 114 on the display 120. In some embodiments, the video stream used to mirror the display of the remote device 114 is generated by capturing and encoding screenshots of the display of the remote device 114 into a video stream feed of high frames per second to give the user 102 a seamless interaction experience with the display 120. In other embodiments, the display 120 can be generated from a video stream from the remote device 114. Using input devices of the local machine 104, the user 102 can interact with the display 120, in the same manner as if the remote device 114 were locally present.

The RDS 100 captures and translates the user interactions to input commands compatible with the remote device 114 and inputs the translated input commands to the remote device 114. The display responses of the remote device 114 are then streamed to the user 102, via display 120. In some embodiments, the user 102 has access to and can activate other displays and menu options, such as developer tools display 122. An example usage of the RDS 100, from the perspective of the user 102, includes, the user 102, opening a browser on the remote device 114, via menu options provided by the dashboard application. The user 102 can access the dashboard application via the browser 106 on the user's local machine 104. The RDS 100 opens the user's selected browser on the remote device 114 and generates a display of the remote device 114 and the remotely opened browser on the browser 106 on the user's local machine 104. The user 102 can then use a mouse to click on a URL field 124 in the display 120, which corresponds to the URL field in the browser on the remote device 114. The user 102 can subsequently enter a URL address in the URL field 124. Simultaneously, the user's interactions, such as mouse clicks and keyboard inputs are captured and translated to the input commands compatible with the remote device 114 at the datacenter 112. For example, the mouse click in the URL field 124 is translated to a tap on the corresponding location on the display of the remote device 114 and the keyboard inputs are translated to keyboard inputs of the remote device 114, causing the remote device 114 to open the user requested URL and download the user requested website. Simultaneously, a video stream of the display of the remote device 114 is sent to and generated on the display 120 on browser 106. In this manner, the user perceives entering a URL in the URL field 124 and seeing the display 120 (a replica of the remote device 114) open the requested URL. Additional interactions of the user 102 can continue in the same manner. The user 102 can use the RDS 100 in the manner described above to perform manual or automated testing.

The display 120 is a pictorial and graphical representation of the remote device 114. The RDS 100 does not open a copy of the browser opened on the remote device 114 or conduct simultaneous parallel processes between the remote device 114 and the local machine 106. Instead, the RDS 100 streams a video feed from the remote device 114 to generate the display 120. Consequently, the user's interactions is inputted to the display 120, appearing as if a functioning browser is receiving the interactions, while the RDS 100 captures, transfers and translates those interactions to the remote device 114, where the functioning browser is operating on the remote device 114.

Another example usage of the RDS 100 includes the user 102 intending to test a user application 126 on the remote device 114. The user application 126 can be a mobile application or any software program that the user 102 intends to develop or test. In some scenarios, the user application 126 includes a feature to play media 128 on the remote device 114. The media 128 can include audio and/or video. For example, the user application 126 can include an internal media player. Alternatively, the user application 126 may call a third-party media player (e.g., YouTube) to replay a media clip in the user application 126. In actual use by an end-user of the user application 126, the user application 126 would use the software and hardware facilities of the device on which it is running to play back media to an end-user, for example, by outputting audio through the speakers of a device, but in the environment of the RDS 100, the user 102 is not present in the same location as the remote device 114. The described embodiments are directed to systems and methods by which the RDS 100 can capture a playback of the media 128 from a user application 126, transmit the media 128 to the browser 106 and playback the media 128 on the local machine 104 via the browser 106. The browser 106 can utilize the hardware and software facilities of the browser 106 and the local machine 104 to playback the media 128.

A variety of communication technologies can be used to establish a communication network between the remote device 114 and the browser 106. The communication between the browser 106 and the remote device 114 can involve streaming of audio, video and/or data. For example, the display of a remote device 114 can be streamed to the browser 106. The communication network between the browser 106 and the remote device 114 can be established by a peer-to-peer (P2P) communication technique, such as Web real time communication (WebRTC). While the embodiments will be described in relation to WebRTC, other P2P communication techniques can also be used to implement the described technology.

WebRTC and some other P2P communication techniques have internal built-in libraries that may be configured by default to transmit media captured only from a hardware facility of a device. For example, WebRTC on Android can stream audio, but the source of the input audio in a WebRTC environment is the microphone of the device. Similarly, the WebRTC environment can transmit audio from a device to another browser, but the source of the input audio for transmission, by default, is from the microphone of the device. This can present a challenge in the environment of the RDS 100, where the user 102 is at a different location than the remote device 114 and intends to test media playback in the user application 126 on the remote device 114. One solution can include capturing the media playback on a remote device 114, using the microphone of the remote device 114 and transmitting the microphone-captured audio via WebRTC to the browser 106. However, this solution can present its own challenges. As the datacenter 112 typically includes many remote devices 114 in the same location and in close proximity to one another. A variety of environmental noise also exists in the datacenters 112, such that playing a media through the speakers of the remote device 114, and capturing the media via the microphone of the remote device 114 may produce muffled or low quality audio for transmission and/or playback at the browsers 106.

An alternative solution can include capturing the media playback directly from the user application 126 and transmitting the captured media to the browser 106. Some device operating systems can include facilities (e.g., via application programing interfaces or APIs) to capture media from an application, such as the user application 126. However, as described earlier, the P2P communication network between the browser 106 and the remote device 114 does not, by default interface with such APIs to transmit audio from a user application 126. The described embodiments include modifying P2P communication network libraries to interface with media capturing APIs of the remote device 114 and transmitting the media from these APIs, as opposed to from the microphone of the remote device 114.

Figure 2:
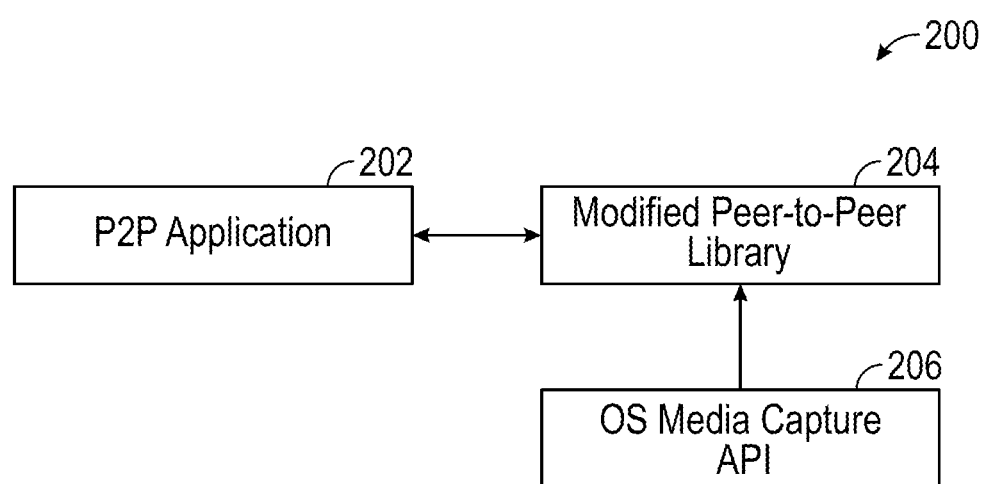
FIG. 2 illustrates a block diagram of a communication network, modified to capture and transmit media received from the operating system (OS) of a device.

FIG. 2 illustrates a block diagram 200 of a communication network, modified to capture and transmit media received from the operating system (OS) of a device, as opposed to from hardware facilities of the device. The communication network can include an application 202 that interfaces with libraries 204. When P2P networks are used, the application 202 is a P2P application. The application 202 can be installed on the remote device 114. One example of the libraries 204 is a libjingle library, which can be used in a WebRTC environment. As described earlier, the libraries 204, by default, interface with and capture media from the hardware facilities of a device, such as a microphone of the remote device 114. In the described embodiments, the libraries 204 can be modified to receive media from one or more operating system (OS) media capture APIs instead of the device hardware components. Once the media is captured, it can be transmitted to the browser 106, just as it would, if the media were captured using the hardware of the device. Example OS media capture facilities include Media-Projection API in Android and ReplayKit in iOS environments. Modification of the libraries 204, therefore includes, decompiling these libraries and replacing hardware calls with support for capturing media using the OS media capturing APIs 206.

Figure 3:
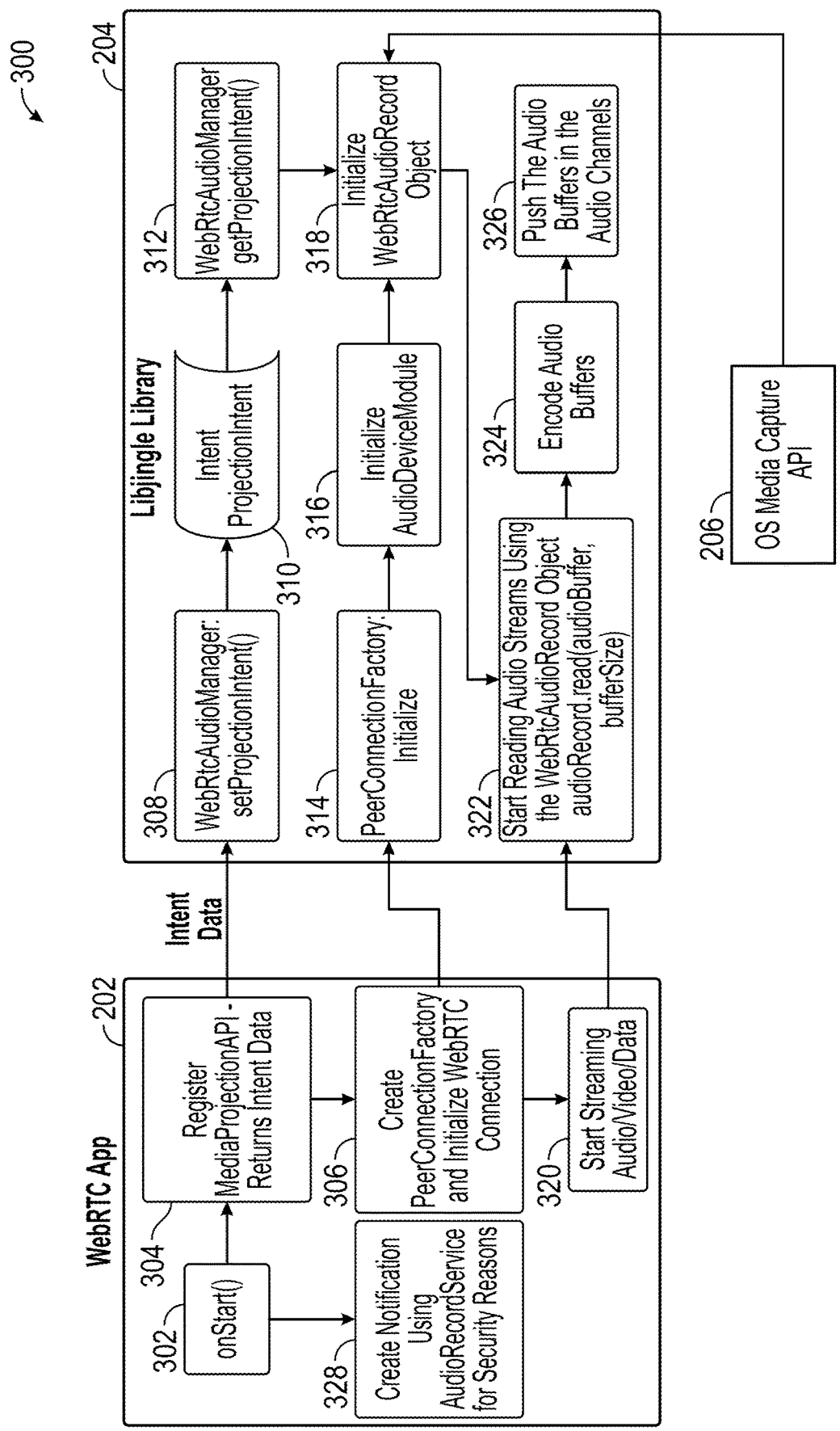
FIG. 3 illustrates a block diagram of a modified communication network, which can capture and transmit media.

FIG. 3 illustrates a block diagram 300 of a modified P2P communication network, which can capture and transmit media from a media capturing API of an operating system of a device. The diagram 300 is illustrated and will be described in the environment of a WebRTC P2P communication network, but can be used in other communication networks as well. The application 202 includes a WebRTC application, which can be installed on the remote device 114 to enable establishing a WebRTC P2P communication network between the browser 106 and the remote device 114. The diagram 300 also illustrates an example method of capturing and transmitting media from a user application 126 installed on a remote device 114 in a datacenter 112 to the browser 106 at a different location remote from the datacenter 112. In the diagram 300, the application 202 is in communication with a library of P2P objects, which can relate to capturing media and handling P2P communication. An example of the library of objects 204 is a libjingle library.

At block 302, a session start message 302 is received. The session can include a request for capturing and streaming media, such as an audio stream or video stream played on a user application 126. At block 328 some notifications, for example those related to security or other purpose notifications can be generated correlated with the session start message 302. At block 304, a MediaProejction API is registered, which can return intent data. In Android environment, the OS handles requests from applications through managing intent data. For example, the intent data can include a request for capturing and transmitting audio using WebRTC or other P2P communication network. Blocks 308, 310, and 312 relate to receiving, initializing and managing the intent data, including passing parameters for type of media to be captured and transmitted and which audio capture modules to initialize. Block 314 includes operations and objects directed to initializing P2P connection. Bock 316 relates to operations or objects for initializing a media device module. Block 318 relates to operations and objects initializing a media record object. Block 320 from the application 202 can provide a start media streaming command. Block 322 includes operations and objects that start recording media using a P2P media record object. Block 322 can include buffering techniques in some implementations. Blocks 324 and 326 relate to operations and objects encoding the media and pushing the media into media channels of the P2P communication network.

By default, the media record object at block 318 and the start audio stream using P2P media record objects at block 322 use the output of the hardware components of the remote device 114. The blocks 318 and 322 can be modified to replace their source input media from the hardware components of the remote device 114 with an OS media capturing API 206. In this manner, the objects at blocks 318 and 322 record, buffer and stream media data from the OS media capturing APIs 206 instead of from the hardware components of the remote device 114. In iOS environment, Replaykit cane replace the operations of the MediaProjection API.

Figure 4:
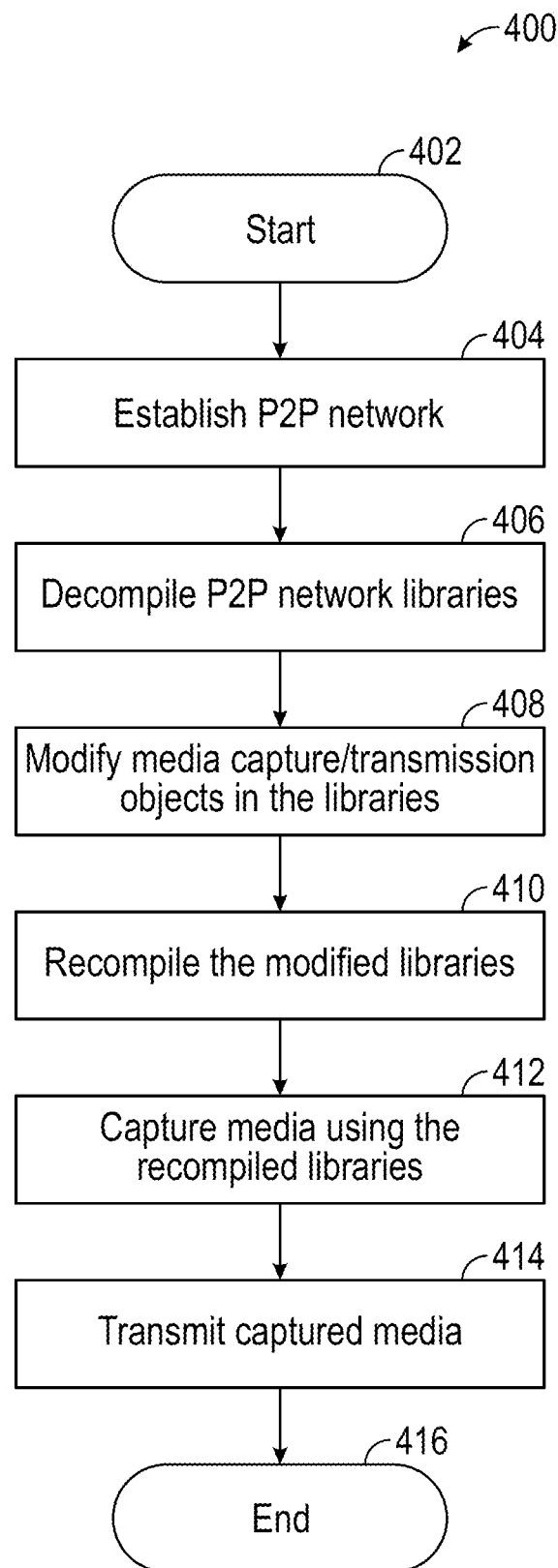
FIG. 4 illustrates a method of media transmission in the environment of the embodiment of FIG. 1.

FIG. 4 illustrates a method 400 of media transmission in the RDS 100 environment. The method starts at step 402. At step 404, a P2P network is established between the remote device 114 and the browser 106. Establishing a P2P network can involve using a communication initiation sever (CIS) and receiving assignments of network pathways by which the remote device 114 and the browser 106 can communicate with one another. As an example, WebRTC can be used to establish a P2P network. The P2P network includes a library of objects that accomplish communication between the remote device 114 and the browser 106, as well as capturing and transmission of audio, video and data. The P2P library of objects can include a media transmission object. The media transmission object may include sub-components and/or children objects and can differ from one operating system environment to the next. For example, in Android environment several libjingle library components can be included in the media transmission object. Examples include, MediaManager, Audio/video manager, WebRTC audio/video manager, media record, AudioRecord, AudioManager, Audio/video Device Module, WebRTC Audio/video Device Module, Media record module, WebRTC media record module and the like.

At step 406, the library of objects of the P2P network can be decompiled to gain access to the media capture objects within the library. Decompiling can be accomplished by a variety of available tools and techniques. For example, in Java environment, example decompilers include Mocha decompiler, JD decompiler, and JAD decompiler. Similar programs exist in the C++environment. An example of the library of objects can include libjingle library configured for WebRTC environment. At step 408, the media capture and transmission objects in the P2P libraries can be modified. The modification can include a variety of operations depending on the environment. For example, the default media object codes can be replaced with patches that obtain the source media not from a hardware components of the remote device 114, but from a media capture of the OS of the remote device 114, such as MediaProjection API and Replaykit API. In other implementations, the media transmission object codes can be parsed and calls to hardware components for capturing media can be replaced with calls to receive media from the OS media capture API 206.

At step 410, the modified libraries and/or objects can be recompiled into executable libraries to which a P2P application 202 can interface. Compilers can be chosen based on the environment of the libraries. Examples include Java and/or C++ compilers. At step 412, media can be captured using the modified and recompiled libraries. At step 414, the captured media can be transmitted using the communication channels of the P2P communication network. For example, in some implementations, the P2P communication network established in the RDS 100 environment can include an audio channel, a video channel and a data channel. The data channel can be used to broadcast or stream a video feed of the display of the remote device 114 to the browser 106, while the data channel can be used to capture and transmit the inputs, commands and interactions of the user 102 with the mirrored display on the browser 106 to the remote device 114. The audio channel of the P2P network can be used to transmit an audio stream (e.g., one captured in the step 412) to the browser 106. The method ends at step 416.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 5:
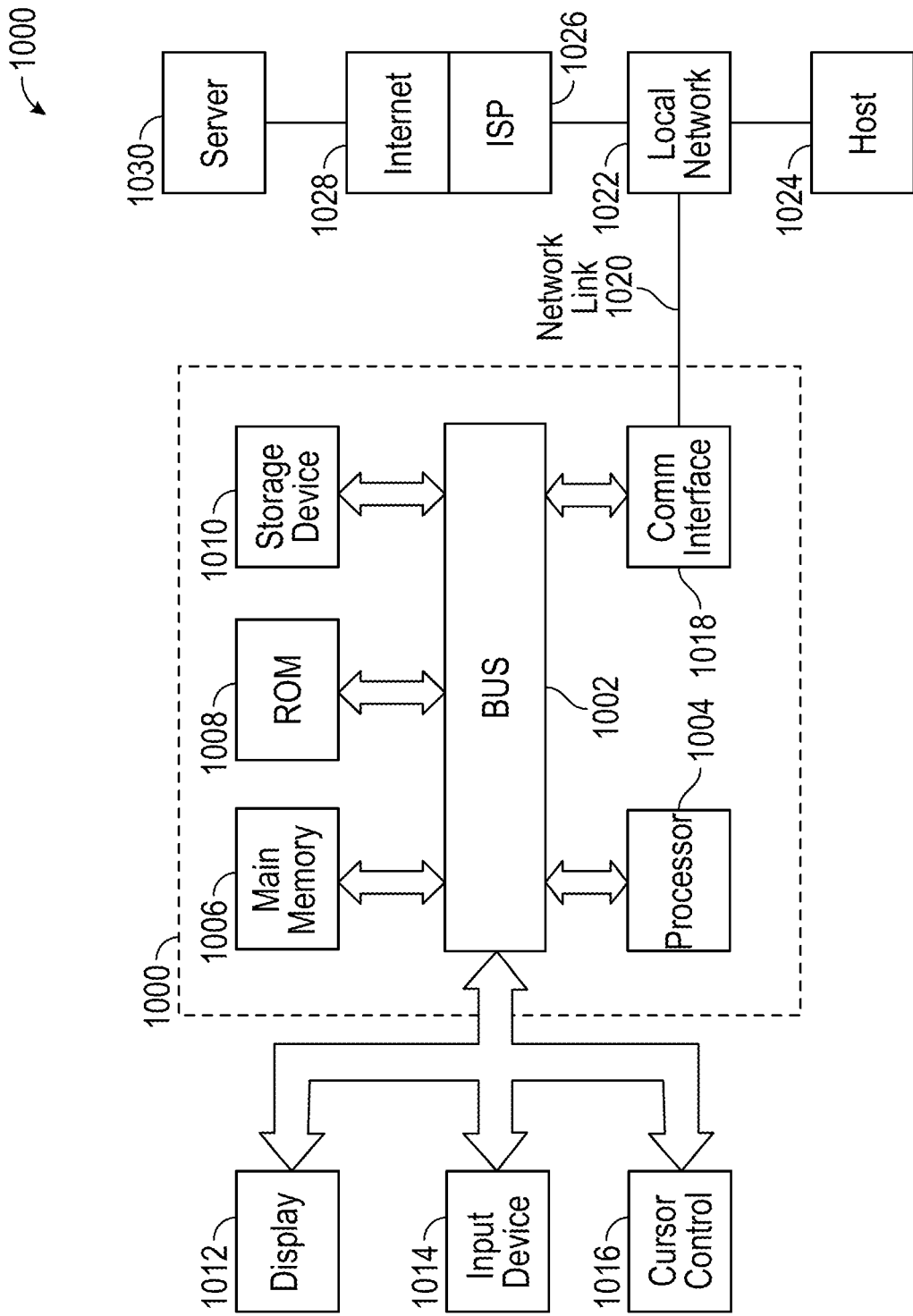
FIG. 5 is a block diagram that illustrates a computer system 1000 upon which an embodiment can be implemented.

For example, FIG. 5 is a block diagram that illustrates a computer system 1000 upon which an embodiment can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Examples

It will be appreciated that the present disclosure may include any one and up to all of the following examples.

Example 1: A method comprising: establishing a peer-to-peer communication network between a browser and a remote device, the peer-to-peer communication network comprising a library of objects, the library of objects comprising a media transmission object, the media transmission object configured, by default, to receive media from hardware components of the remote device and transmit the media over the peer-to-peer communication network; decompiling the library of objects of the peer-to-peer communication network; modifying the media transmission object to receive the media from a media capturing API of an operating system of the remote device, instead of the hardware components of the remote device; recompiling the library of objects and the modified media transmission object; capturing, via the recompiled library, media from the operating system media capturing API; and transmitting the captured media to the browser.

Example 2: The method of Example 1, wherein the operating system comprises Android or iOS.

Example 3: The method of some or all of Examples 1 and 2, wherein the browser is at a first location running on a desktop or laptop computer and the remote device is at a data center remote from the first location.

Example 4: The method of some or all of Examples 1-3, wherein the peer-to-peer communication network comprises a WebRTC network.

Example 5: The method of some or all of Examples 1-4, wherein the media capturing APIs comprise Android MediaProjection API or iOS ReplayKit.

Example 6: The method of some or all of Examples 1-5, wherein the library of objects comprise libjingle library.

Example 7: The method of some or all of Examples 1-6, wherein the media transmission object comprises a media manager of the libjingle library of a WebRTC peer-to-peer communication network.

Example 8: A non-transitory computer storage that stores executable program instructions that, when executed by one or more computing devices, configure the one or more computing devices to perform operations comprising: establishing a peer-to-peer communication network between a browser and a remote device, the peer-to-peer communication network comprising a library of objects, the library of objects comprising a media transmission object, the media transmission object configured, by default, to receive media from hardware components of the remote device and transmit the media over the peer-to-peer communication network; decompiling the library of objects of the peer-to-peer communication network; modifying the media transmission object to receive the media from a media capturing API of an operating system of the remote device, instead of the hardware components of the remote device; recompiling the library of objects and the modified media transmission object; capturing, via the recompiled library, media from the operating system media capturing API; and transmitting the captured media to the browser.

Example 9: The non-transitory computer storage of Example 8, wherein the operating system comprises Android or iOS.

Example 10: The non-transitory computer storage of some or all of Examples 8 and 9, wherein the browser is at a first location running on a desktop or laptop computer and the remote device is at a data center remote from the first location.

Example 11: The non-transitory computer storage of some or all of Examples 8-10, wherein the peer-to-peer communication network comprises a WebRTC network.

Example 12: The non-transitory computer storage of some or all of Examples 8-11, wherein the media capturing APIs comprise Android MediaProjection API or iOS ReplayKit.

Example 13: The non-transitory computer storage of some or all of Examples 8-12, wherein the library of objects comprise libjingle library.

Example 14: The non-transitory computer storage of some or all of Examples 8-13, wherein the media transmission object comprises a media manager of the libjingle library of a WebRTC peer-to-peer communication network.

Example 15: A system comprising a processor, the processor configured to perform operations comprising: establishing a peer-to-peer communication network between a browser and a remote device, the peer-to-peer communication network comprising a library of objects, the library of objects comprising a media transmission object, the media transmission object configured, by default, to receive media from hardware components of the remote device and transmit the media over the peer-to-peer communication network; decompiling the library of objects of the peer-to-peer communication network; modifying the media transmission object to receive the media from a media capturing API of an operating system of the remote device, instead of the hardware components of the remote device; recompiling the library of objects and the modified media transmission object; capturing, via the recompiled library, media from the operating system media capturing API; and transmitting the captured media to the browser.

Example 16: The system of Example 15, wherein the operating system comprises Android or iOS.

Example 17: The system of some or all of Examples 15 and 16, wherein the browser is at a first location running on a desktop or laptop computer and the remote device is at a data center remote from the first location.

Example 18: The system of some or all of Examples 15-17, wherein the peer-to-peer communication network comprises a WebRTC network.

Example 19: The system of some or all of Examples 15-18, wherein the media capturing APIs comprise Android MediaProjection API or iOS ReplayKit.

Example 20: The system of some or all of Examples 15-19, wherein the library of objects comprise libjingle library.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
    in a communication network, comprising a library of objects, wherein the library of objects, at least in part, enables communication, via the communication network, with a remote device, and the library of objects comprises a media transmission object, wherein the media transmission object of the communication network is configured, by default, to receive media from hardware components of the remote device, decompiling the library of objects of the communication network;

modifying the media transmission object of the communication network to receive the media from a media capturing API of an operating system of the remote device, instead of the hardware components of the remote device;

recompiling the library of objects and the modified media transmission object;

capturing, via the recompiled library, media from the operating system media capturing API; and transmitting the captured media from the remote device.

2. The method of claim 1, wherein the operating system comprises Android or iOS.

3. The method of claim 1, wherein the communication network is between a browser and the remote device, and the browser is at a first location running on a desktop or laptop computer and the remote device is at a datacenter remote from the first location.

4. The method of claim 1, wherein the communication network comprises a peer-to-peer communication network.

5. The method of claim 1, wherein the media capturing APIs comprise Android MediaProjection API or iOS ReplayKit.

6. The method of claim 1, wherein modifying the media transmission object comprises: parsing a media transmission object code; and replacing calls to the hardware components for capturing media, to calls to the operating system media capturing API.

7. The method of claim 1, wherein the media transmission object comprises a media manager of the libjingle library of a WebRTC peer-to-peer communication network.

8. A non-transitory computer storage that stores executable program instructions that, when executed by one or more computing devices, configure the one or more computing devices to perform operations comprising:

in a communication network, comprising a library of objects, wherein the library of objects, at least in part, enables communication, via the communication network, with a remote device, and the library of objects comprises a media transmission object, wherein the media transmission object of the communication network is configured, by default, to receive media from hardware components of the remote device, decompiling the library of objects of the communication network;

modifying the media transmission object of the communication network to receive the media from a media capturing API of an operating system of the remote device, instead of the hardware components of the remote device;

recompiling the library of objects and the modified media transmission object;

capturing, via the recompiled library, media from the operating system media capturing API; and transmitting the captured media from the remote device.

9. The non-transitory computer storage of claim 8, wherein the operating system comprises Android or iOS.

10. The non-transitory computer storage of claim 8, wherein the communication network is between a browser and the remote device, and the browser is at a first location running on a desktop or laptop computer and the remote device is at a datacenter remote from the first location.

11. The non-transitory computer storage of claim 8, wherein the communication network comprises a peer-to-peer communication network.

12. The non-transitory computer storage of claim 8, wherein the media capturing APIs comprise Android MediaProjection API or iOS ReplayKit.

13. The non-transitory computer storage of claim 8, wherein modifying the media transmission object comprises: parsing a media transmission object code; and replacing calls to the hardware components for capturing media, to calls to the operating system media capturing API.

14. The non-transitory computer storage of claim 8, wherein the media transmission object comprises a media manager of the libjingle library of a WebRTC peer-to-peer communication network.

15. A system comprising a processor, the processor configured to perform operations comprising:

in a communication network, comprising a library of objects, wherein the library of objects, at least in part, enables communication, via the communication network, with a remote device, and the library of objects comprises a media transmission object, wherein the media transmission object of the communication network is configured, by default, to receive media from hardware components of the remote device, decompiling the library of objects of the communication network;

modifying the media transmission object of the communication network to receive the media from a media capturing API of an operating system of the remote device, instead of the hardware components of the remote device;

recompiling the library of objects and the modified media transmission object;

capturing, via the recompiled library, media from the operating system media capturing API; and transmitting the captured media from the remote device.

16. The system of claim 15, wherein the operating system comprises Android or iOS.

17. The system of claim 15, wherein the communication network is between a browser and the remote device, and the browser is at a first location running on a desktop or laptop computer and the remote device is at a datacenter remote from the first location.

18. The system of claim 15, wherein the communication network comprises a peer-to-peer communication network.

19. The system of claim 15, wherein the media capturing APIs comprise Android MediaProjection API or iOS ReplayKit.

20. The system of claim 15, wherein modifying the media transmission object comprises: parsing a media transmission object code; and replacing calls to the hardware components for capturing media, to calls to the operating system media capturing API.

* * * * *